United States Patent
Lee et al.

(10) Patent No.: US 7,946,326 B2
(45) Date of Patent: May 24, 2011

(54) AUTOMATIC SHEET LAMINATING APPARATUS AND AUTOMATIC SHEET LAMINATING METHOD

(75) Inventors: Bin-Tao Lee, Taipei (TW); Jiang-Wei Wu, Guangzhou (CN); Xiao-Xiong Wei, Guangzhou (CN)

(73) Assignee: Primax Electronics Ltd., Taipei (TW)

( * ) Notice: Subject to any disclaimer, the term of this patent is extended or adjusted under 35 U.S.C. 154(b) by 53 days.

(21) Appl. No.: 12/614,177

(22) Filed: Nov. 6, 2009

(65) Prior Publication Data
US 2011/0073234 A1  Mar. 31, 2011

(30) Foreign Application Priority Data
Sep. 25, 2009  (TW) ............................... 98132391 A (51) Int. Cl.
*B29C 65/00* (2006.01)
(52) U.S. Cl. ..... 156/367; 53/381.7; 53/384.1; 271/10.1; 271/10.09
(58) Field of Classification Search .................. 156/367, 156/362, 502; 53/381.7, 384.1; 271/10.01, 271/10.09
See application file for complete search history.

(56) References Cited

U.S. PATENT DOCUMENTS

| | | | | |
|---|---|---|---|---|
| 5,902,431 A | * | 5/1999 | Wilkinson et al. | 156/159 |
| 2006/0162841 A1 | * | 7/2006 | Hong | 156/64 |
| 2008/0236757 A1 | * | 10/2008 | Huang et al. | 156/367 |

* cited by examiner

*Primary Examiner* — Khanh Nguyen
*Assistant Examiner* — Vishal I Patel
(74) *Attorney, Agent, or Firm* — Kirton & McConkie; Evan R. Witt (57) ABSTRACT

An automatic sheet laminating apparatus includes a first sheet input tray, a second sheet input tray, a plurality of transfer roller assemblies, a separating roller assembly, a braking sensor, a braking element, a laminating module, and a control unit. The first sheet input tray is used for placing a pouch including a first film and a second film. The second sheet input tray is used for placing a sheet article. The separating roller assembly includes a separating driving roller and a separating follower roller. When the pouch is detected by the braking sensor, the braking element stops rotation of the separating follower roller. After a first predetermined time period, the separating follower roller is rotated again. As such, the rear ends of the first film and the second film are separated from each other, so that the sheet article could be inserted between the first film and the second film.

14 Claims, 4 Drawing Sheets

AUTOMATIC SHEET LAMINATING APPARATUS AND AUTOMATIC SHEET LAMINATING METHOD

FIELD OF THE INVENTION

The present invention relates to an automatic sheet laminating apparatus, and more particularly to an automatic sheet laminating apparatus for automatically separating two films of a pouch and laminating a sheet article between these two films.

BACKGROUND OF THE INVENTION

Conventionally, a sheet article such as a document or a photo is usually covered with a protective film for protection because such a sheet article is readily suffered from damage. Typically, a sheet laminating apparatus (or a laminator) is used for heating and pressing a sheet article between two pieces of heat-activated films in order to achieve the protective purpose. Hereinafter, the configurations and the operation principles of a conventional sheet laminating apparatus will be illustrated with reference to FIG. 1.

Figure 1:
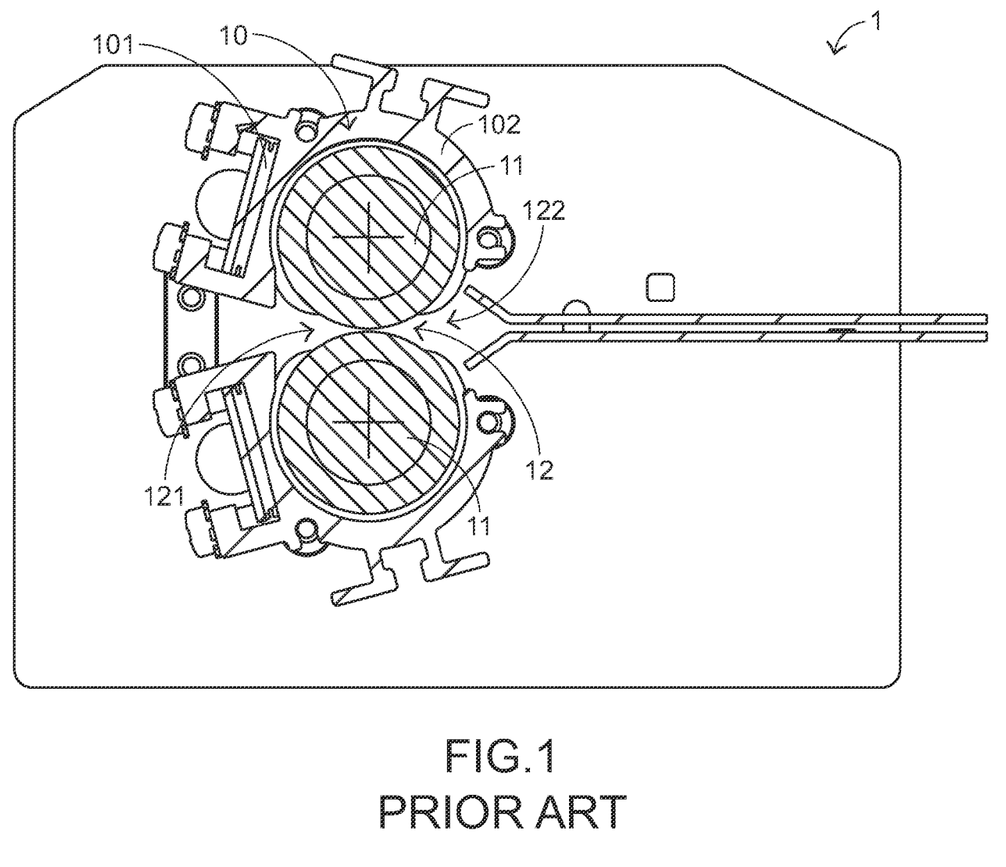
FIG. 1 is a schematic cross-sectional view illustrating a conventional sheet laminating apparatus.

FIG. 1 is a schematic cross-sectional view illustrating a conventional sheet laminating apparatus. As shown in FIG. 1, the sheet laminating apparatus 1 comprises a heat-treating mechanism 10, a transmitting and pressing mechanism 11 and a transfer passage 12. The heat-treating mechanism 10 includes a heater 101 and an electrically-heated plate 102.

The process for laminating a sheet article (not shown) by using the sheet laminating apparatus 1 will be described as follows. First of all, the sheet article is sandwiched between an upper heat-activated film and a lower heat-activated film of a pouch to form a sandwich structure. Then, the sandwich structure is fed into the transfer passage 12 through an entrance 121. By means of the transmitting and pressing mechanism 11, the sandwich structure is continuously transported through the passage 12. During this stage, the electrically-heated plate 102 of the heat-treating mechanism 10 transforms electricity to heat energy so as to preheat the sandwich structure. The heat energy generated by the electrically-heated plate 102 is uniformly distributed over the heater 101, and radiated through an air gap between the heater 101 and the transmitting and pressing mechanism 11 so as to heat up the transmitting and pressing mechanism 10. The transmitting and pressing mechanism 11 presses against opposite sides of the sandwich structure that is transported through the transfer passage 12, and transmits the heat energy to the sandwich structure so as to soften the heat-activated films. After being transmitted and pressed (or laminated) by the transmitting and pressing mechanism 11, the sheet article bonds with the softened heat-activated films to form a laminate structure. Meanwhile, the sheet article is fixed between these two pieces of heat-activated films. After the laminated sandwich structure is withdrawn from an exit 122 of the transfer passage 12, the laminating operation of the sheet laminating apparatus 1 is completed.

Generally, the upper heat-activated film and the lower heat-activated film of the pouch are connected with each other such that one side of the pouch is sealed. For laminating a sheet article between two films of the pouch, the rear ends of these two films are firstly separated from each other, then the sheet article is inserted into the space between the two films, and finally the combination of the sheet article and the films is laminated by the sheet laminating apparatus 1. Moreover, for laminating a plurality of sheet articles by the sheet laminating apparatus 1, the sheet articles should be successively inserted into respective pouches. The procedure of successively inserting the sheet articles into respective pouches is labor-intensive and time-consuming. Moreover, since the sheet article is manually inserted into the space between the two films of the pouch, the alignment precision of the sheet article in relation to the pouch is deteriorated and the combination of the sheet article and the pouch is not aesthetically pleasing.

SUMMARY OF THE INVENTION

The present invention relates to an automatic sheet laminating apparatus for laminating a sheet article and a pouch in order to save labor power.

In accordance with an aspect of the present invention, there is provided an automatic sheet laminating method. The automatic sheet laminating method includes steps of: (S1) transporting a pouch including a first film and a second film, wherein the first film is stacked on the second film and a front end of the first film is connected with a front end of the second film, (S2) stopping transporting the pouch such that the first film is bent, (S3) continuously transporting the pouch such that a rear end of the first film is separated from a rear end of the second film, (S4) transporting a sheet article to be inserted into a space between the first film and the second film, and (S5) laminating the sheet article between the first film and the second film of the pouch.

In an embodiment, after the step (S3) and before the step (S4), the automatic sheet laminating method further includes a step (S31) of: clamping the front end of the first film and the front end of the second film to fix the pouch after the rear end of the first film is separated from the rear end of the second film.

In an embodiment, after the step (S4) and before the step (S5), the automatic sheet laminating method further includes a step (S41) of: stopping transporting the sheet article such that a distance between a front end of the sheet article and the front end of the first film is equal to a spacing interval value.

In accordance with another aspect of the present invention, there is provided an automatic sheet laminating apparatus for laminating a sheet article and a pouch. The automatic sheet laminating apparatus includes a first sheet input tray, a second sheet input tray, a plurality of transfer roller assemblies, a separating roller assembly, a braking sensor, a braking element, and a control unit. The first sheet input tray is used for placing the pouch, wherein the pouch includes a first film and a second film, and a front end of the first film is connected with a front end of the second film. The second sheet input tray is used for placing the sheet article. The transfer roller assemblies are used for transporting the pouch and the sheet article. The separating roller assembly is arranged at a first side of a combining zone for separating a rear end of the first film from a rear end of the second film. The separating roller assembly includes a separating driving roller and a separating follower roller. The separating follower roller is rotated with the separating driving roller. The braking sensor is arranged in the combining zone. The braking sensor generates a braking signal when the pouch is detected. The braking element is connected to the separating follower roller for controlling whether the separating follower roller stops rotation in response to the braking signal. The control unit is electrically connected to the braking sensor and the braking element for controlling the separating follower roller to stop rotation in response to the braking signal, and controlling the separating follower roller to rotate again after the braking signal has been received for a predetermined time period. During the separating follower roller stops rotation, the separating driving roller is contacted with the first film such that the rear end of the first film is moved from a first side of the separating driving roller to a second side of the separating driving roller. During the separating follower roller is rotated again, the separating follower roller is contacted with the second film such that the rear end of the second film is moved from a first side of the separating follower roller to a second side of the separating follower roller.

In an embodiment, the automatic sheet laminating apparatus further includes a first separating sensor. The first separating sensor is arranged at a second side of the separating driving roller and electrically connected to the control unit for detecting whether the rear end of the first film is transported to the second side of the separating driving roller.

In an embodiment, the automatic sheet laminating apparatus further includes a second separating sensor. The a second separating sensor is arranged at a second side of the separating follower roller and electrically connected to the control unit for detecting whether the rear end of the second film is transported to the second side of the separating follower roller. When the rear end of the first film is detected by the first separating sensor and the rear end of the second film is detected by the second separating sensor, the second separating sensor generates a sheet article feeding signal to the control unit, and the sheet article is transported in response to the sheet article feeding signal.

In an embodiment, the transfer roller assemblies include a first sheet pick-up roller assembly, a second sheet pick-up roller assembly and a sheet ejecting roller assembly. The first sheet pick-up roller assembly is disposed over the first sheet input tray for feeding the pouch into an internal portion of the automatic sheet laminating apparatus. The second sheet pick-up roller assembly is disposed over the second sheet input tray for feeding the sheet article into the internal portion of the automatic sheet laminating apparatus. The sheet ejecting roller assembly is arranged at a second side of the combining zone for ejecting a laminated structure of the pouch and the sheet article from the automatic sheet laminating apparatus.

In an embodiment, the first sheet pick-up roller assembly includes a first sheet pick-up roller and a first sheet separation roller, and the second sheet pick-up roller assembly includes a second sheet pick-up roller and a second sheet separation roller.

In an embodiment, the automatic sheet laminating apparatus further includes a first electromagnetic clutch and a second electromagnetic clutch. The first electromagnetic clutch is electrically connected to the first sheet separation roller and the control unit to allow for an idle running action of the first sheet separation roller, so that the pouch in contact with the first sheet pick-up roller fails to be fed into the internal portion of the automatic sheet laminating apparatus. The second electromagnetic clutch electrically connected to the second sheet separation roller and the control unit to allow for an idle running action of the second sheet separation roller, so that the pouch in contact with the second sheet pick-up roller fails to be fed into the internal portion of the automatic sheet laminating apparatus. When the sheet article feeding signal is received by the control unit, the second electromagnetic clutch is controlled to be magnetized, so that the second sheet separation roller is driven to rotate to transport the sheet article.

In an embodiment, the automatic sheet laminating apparatus further includes a combining-status sensor. The combining-status sensor is arranged at a second side of the combining zone and electrically connected to the control unit. The combining-status sensor generates a reversing signal to the control unit when the pouch is detected by the combining-status sensor but the sheet article has not been detected by the combining-status sensor.

In an embodiment, the automatic sheet laminating apparatus further includes a combining roller assembly. The combining roller assembly is arranged between the combining zone and the combining-status sensor and electrically connected to the control unit for transporting the pouch and the sheet article. In response to the reversing signal, a rotating direction of the combining roller assembly is reversed, so that the pouch is moved backwardly to the combining zone.

In an embodiment, when the pouch is moved backwardly to the combining zone and the pouch is detected by the combining-status sensor again, the combining-status sensor issues a disabling signal to the control unit after a delaying time. The combining roller assembly stops rotation and clamps the pouch in response to the disabling signal.

In an embodiment, the automatic sheet laminating apparatus further includes a spacing interval sensor. The spacing interval sensor is arranged between the combining zone and the combining roller assembly and electrically connected to the control unit. When the sheet article is detected by the spacing interval sensor, the spacing interval sensor generates a spacing interval signal to the control unit. After the spacing interval signal has been received by the control unit for a second predetermined time period, the separating roller assembly is disabled, so that the sheet article is no longer transported by the separating roller assembly and a distance between a front end of the sheet article and the front end of the first film is equal to a spacing interval value.

In an embodiment, when the pouch and the sheet article are being transported through the combining-status sensor, the pouch and the sheet article are both detected by the combining-status sensor. Until the pouch and the sheet article are no longer detected by the combining-status sensor, the combining-status sensor generates a pouch feeding signal to the control unit. In response to the pouch feeding signal, a next pouch is transported into an internal portion of the automatic sheet laminating apparatus.

In an embodiment, the automatic sheet laminating apparatus further includes a laminating module. The laminating module is arranged at a second side of the combining zone for laminating the sheet article between the first film and the second film of the pouch.

In an embodiment, the braking element is an electromagnet.

In an embodiment, the control unit is a microprocessor.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 2:
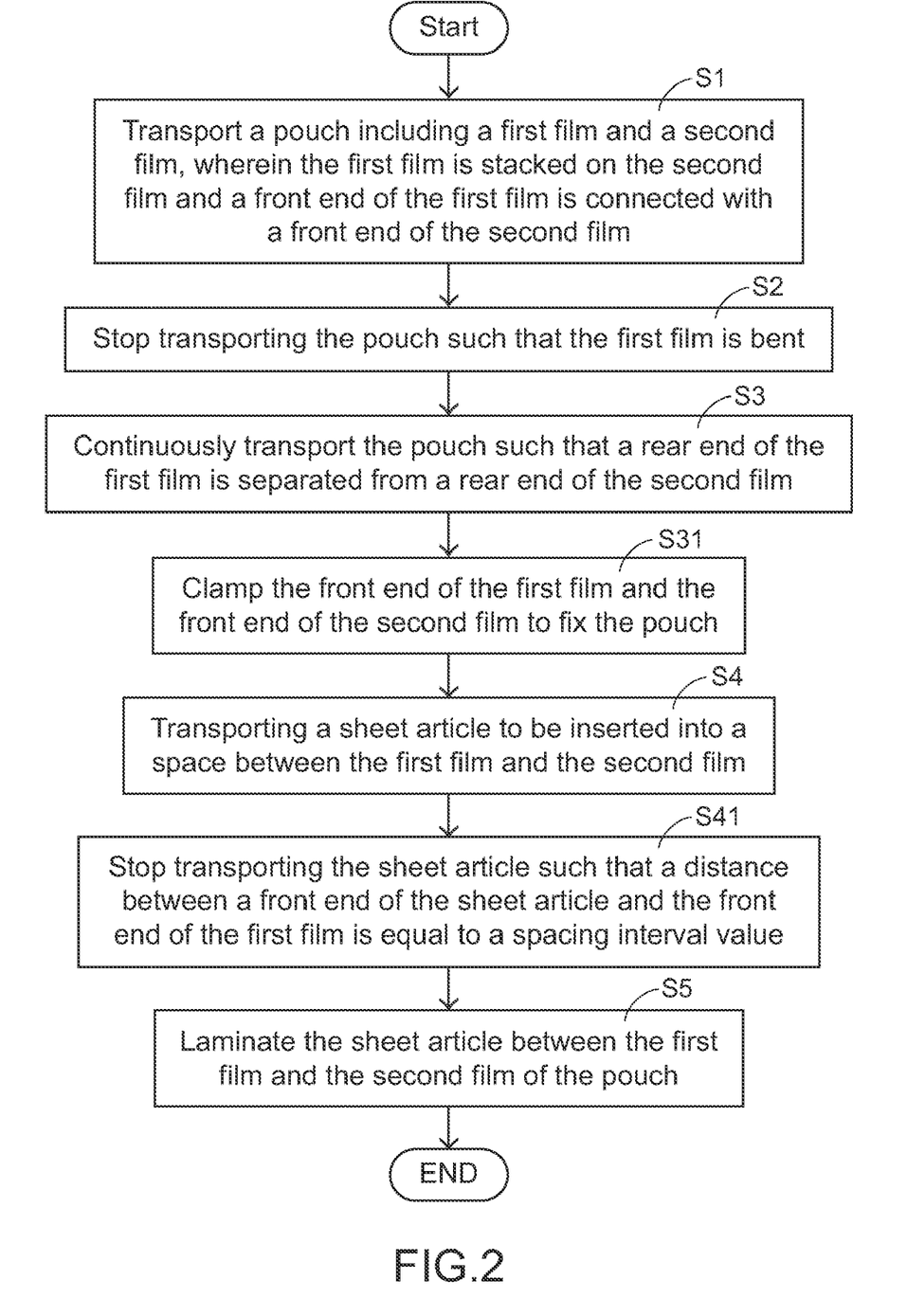
FIG. 2 is a flowchart illustrating an automatic sheet laminating method according to an embodiment of the present invention.

The present invention provides an automatic sheet laminating apparatus and an automatic sheet laminating method for automatically combining the films of a pouch and a sheet article in order to obviate the drawbacks encountered from the prior art. FIG. 2 is a flowchart illustrating an automatic sheet laminating method according to an embodiment of the present invention. Firstly, a pouch including a first film and a second film is transported into an internal portion of an automatic sheet laminating apparatus, wherein the first film is stacked on the second film and a front end of the first film is connected with a front end of the second film (Step S1). Then, the transportation of the pouch is stopped such that the first film is bent (Step S2). Then, the pouch is continuously transported such that a rear end of the first film is separated from a rear end of the second film (Step S3). After the rear end of the first film is separated from the rear end of the second film, the front end of the first film and the front end of the second film are clamped to fix the pouch (Step S31). Then, the sheet article is transported to be inserted into a space between the first film and the second film (Step S4). Then, the transportation of the sheet article is stopped such that the distance between a front end of the sheet article and the front end of the first film is equal to a spacing interval value (Step S41). Afterwards, the sheet article is laminated between the first film and the second film of the pouch (Step S5). The automatic sheet laminating method will be described later when the automatic sheet laminating apparatus is illustrated.

Figure 3:
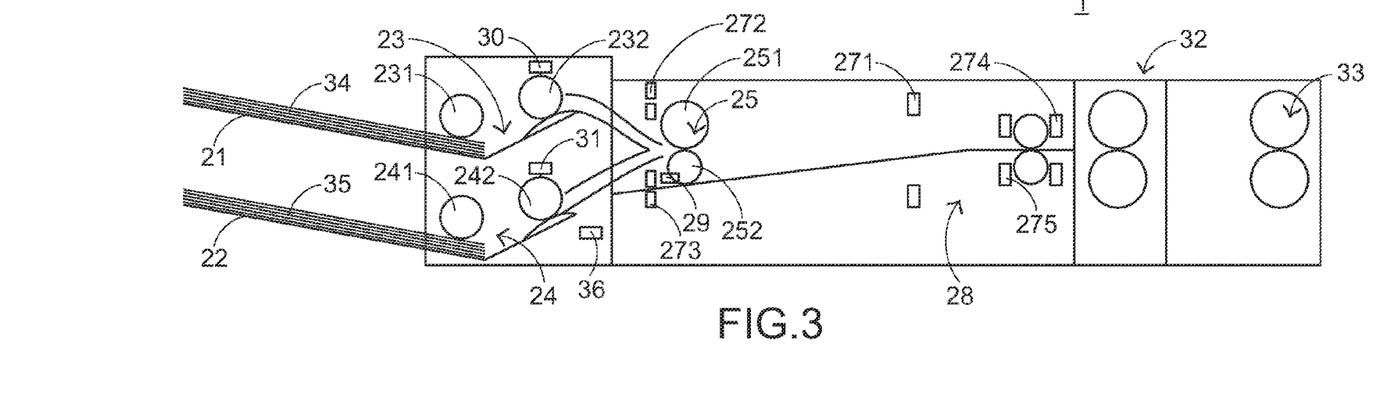
FIG. 3 is a schematic cross-sectional view illustrating an automatic sheet laminating apparatus according to an embodiment of the present invention.

FIG. 3 is a schematic cross-sectional view illustrating an automatic sheet laminating apparatus according to an embodiment of the present invention. As shown in FIG. 3, the automatic sheet laminating apparatus 2 comprises a first sheet input tray 21, a second sheet input tray 22, a plurality of transfer roller assemblies, a separating roller assembly 25, a combining roller assembly 26, a combining zone 28, a braking element 29, a braking sensor 271, a first separating sensor 272, a second separating sensor 273, a combining-status sensor 274, a spacing interval sensor 275, a laminating module 32 and a control unit 36. The first sheet input tray 21 is used for placing a pouch 34. The second sheet input tray 22 is used for placing a sheet article 35 to be laminated. The pouch 34 includes a first film 341 and a second film 342 that are heat-activated. The front end of the first film 341 and the front end of the second film 342 are connected with each other such that one side of the pouch 34 is sealed.

The separating roller assembly 25 is arranged at a first side of the combining zone 28 for separating a rear end 3412 of the first film 341 from a rear end 3422 of the second film 342. The separating roller assembly 25 comprises a separating driving roller 251 and a separating follower roller 252. The separating follower roller 252 is rotated upon rotation of the separating driving roller 251. The braking sensor 271 is arranged in the combining zone 28. When the pouch 34 is detected by the braking sensor 271, the braking sensor 271 generates a braking signal. The braking element 29 is electrically connected to the separating follower roller 252. In response to the braking signal, the braking element 29 stops rotation of the separating follower roller 252. The braking sensor 271 and the braking element 29 are electrically connected to the control unit 36. An example of the control unit 36 is a microprocessor. Under control of the control unit 36, the braking element 29 stops rotation of the separating follower roller 252 when the braking signal is received. In addition, after the braking signal has been received for a first predetermined time period, the separating follower roller 252 is rotated again. In an embodiment, the braking element 29 is an electromagnet. The relationship between the separating roller assembly 25, the braking element 29, the braking sensor 271 and the control unit 36 will be illustrated later.

The first separating sensor 272 is arranged at a second side of the separating driving roller 251 and electrically connected to the control unit 36. The first separating sensor 272 is used for detecting whether the rear end 3412 of the first film 341 is transported to the second side of the separating driving roller 251. The second separating sensor 273 is arranged at a second side of the separating follower roller 252 and electrically connected to the control unit 36. The second separating sensor 273 is used for detecting whether the rear end 3422 of the second film 342 is transported to the second side of the separating follower roller 252. The combining-status sensor 274 is arranged at the second side of the combining zone 28 and electrically connected to the control unit 36. When the pouch 34 is detected by the combining-status sensor 274 but the sheet article 35 has not been detected by the combining-status sensor 274, the combining-status sensor 274 generates a reversing signal to the control unit 36. The combining roller assembly 26 is arranged between the combining zone 28 and the combining-status sensor 274, and electrically connected to the control unit 36. The combining roller assembly 26 is used for transporting the pouch 34 and the sheet article 35. In addition, in response to the reversing signal, the rotating direction of the combining roller assembly 26 is reversed, so that the pouch 34 is moved backwardly to the combining zone 28. The spacing interval sensor 275 is arranged between the combining zone 28 and the combining roller assembly 26, and electrically connected to the control unit 36. When the sheet article 35 is detected by the spacing interval sensor 275, the spacing interval sensor 275 generates a spacing interval signal to the control unit 36. After the spacing interval signal has been received by the control unit 36 for a second predetermined time period, the separating roller assembly 25 is not rotated such that the sheet article 35 is no longer transported by the separating roller assembly 25. The laminating module 32 is arranged at the second side of the combining zone 28 for laminating the sheet article 35 between the two films of the pouch 34.

The transfer roller assemblies comprise a first sheet pick-up roller assembly 23, a second sheet pick-up roller assembly 24 and a sheet ejecting roller assembly 33. The transfer roller assemblies are used for transporting the pouch 34 and the sheet article 35. The first sheet pick-up roller assembly 23 is disposed over the first sheet input tray 21 for feeding the pouch 34 into the internal portion of the automatic sheet laminating apparatus 2. The first sheet pick-up roller assembly 23 comprises a first sheet pick-up roller 231 and a first sheet separation roller 232. The second sheet pick-up roller assembly 24 is disposed over the second sheet input tray 22 for feeding the pouch 34 into the internal portion of the automatic sheet laminating apparatus 2. The second sheet pick-up roller assembly 24 comprises a second sheet pick-up roller 241 and a second sheet separation roller 242. The sheet ejecting roller assembly 33 is arranged at the second side of the combining zone 28 for ejecting the laminated structure of the pouch 34 and the sheet article 35 from the automatic sheet laminating apparatus 2. The automatic sheet laminating apparatus 2 further comprises a first electromagnetic clutch 30 and a second electromagnetic clutch 31. The first electromagnetic clutch 30 is electrically connected to the first sheet separation roller 232 and the control unit 36 to allow for an idle running action of the first sheet separation roller 232, so that the pouch 34 in contact with the first sheet pick-up roller 231 fails to be fed into the internal portion of the automatic sheet laminating apparatus 2. The second electromagnetic clutch 31 is electrically connected to the second sheet separation roller 242 and the control unit 36 to allow for an idle running action of the second sheet separation roller 242, so that the pouch 34 in contact with the second sheet pick-up roller 241 fails to be fed into the internal portion of the automatic sheet laminating apparatus 2.

Figure 4:
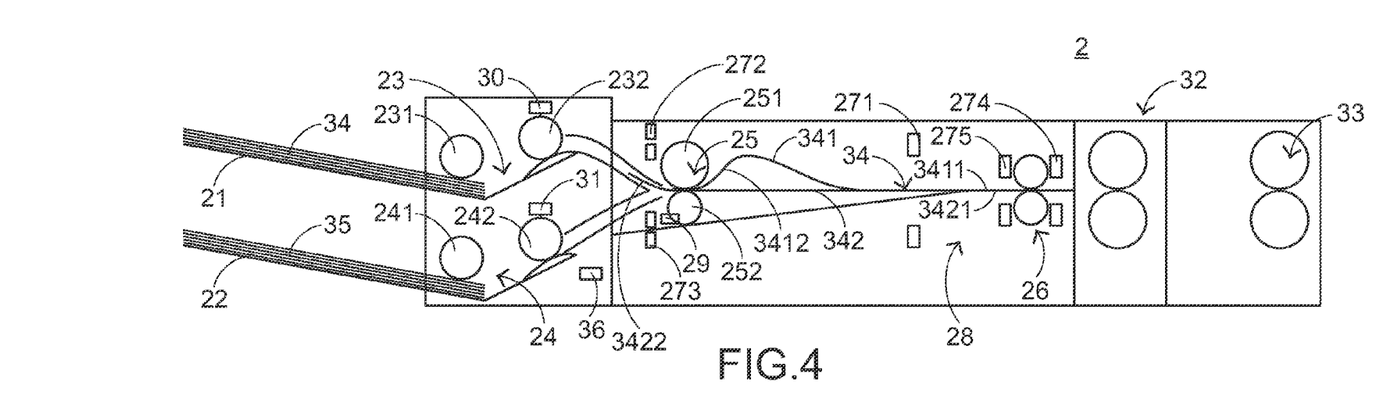
FIG. 4 is a schematic cross-sectional view illustrating the movement of the first film of the pouch by the automatic sheet laminating apparatus according to the embodiment of the present invention.

Hereinafter, the procedure of operating the automatic sheet laminating apparatus 2 will be illustrated with reference to FIGS. 2, 3 and 4. FIG. 4 is a schematic cross-sectional view illustrating the movement of the first film of the pouch by the automatic sheet laminating apparatus according to the embodiment of the present invention. Firstly, a stack of punches 34 are placed on the first sheet input tray 21 and a stack of sheet articles 35 are placed on the second sheet input tray 22 (see FIG. 3). When the automatic sheet laminating apparatus 2 is activated, the punches 34 are transported by the first sheet pick-up roller 231 to the first sheet separation roller 232. By the first sheet separation roller 232, the pouch 34 in direct contact with the first sheet separation roller 232 is allowed to be fed into the internal portion of the automatic sheet laminating apparatus 2 (Step S1). Meanwhile, the remaindering pouches 34 are in contacted with the first sheet pick-up roller 231. After the pouch 34 is fed into the internal portion of the automatic sheet laminating apparatus 2, the control unit 36 stops magnetizing the first electromagnetic clutch 30, thereby allowing for an idle running action of the first sheet separation roller 232. Under this circumstance, the remaindering pouches 34 fail to be fed into the internal portion of the automatic sheet laminating apparatus 2.

After the pouch 34 is fed into the internal portion of the automatic sheet laminating apparatus 2, the separating roller assembly 25 is rotated to transport the pouch 34, wherein the first film 341 of the pouch 34 is contacted with the separating driving roller 251 of the separating roller assembly 25 and the second film 342 is contacted with the separating follower roller 252 of the separating roller assembly 25. The pouch 34 is continuously transported by the separating roller assembly 25. When the pouch 34 is detected by the braking sensor 271 that is arranged in the combining zone 28, the braking sensor 271 generates a braking signal to the control unit 36. In response to the braking signal, the braking element 29 stops rotation of the separating follower roller 252 such that the pouch is no longer transported by the separating roller assembly 25 (Step S2). At the moment when the separating follower roller 252 is not rotated, the separating driving roller 251 is continuously rotated. As the separating driving roller 251 is continuously rotated, the first film 341 that is in direct contact with the separating driving roller 251 is bent upwardly (see FIG. 4).

After the braking signal has been received by the control unit 36 for the first predetermined time period, the separating follower roller 252 is rotated again under control of the control unit 36. During the first predetermined time period from a first time spot of stopping rotating the separating follower roller 252 to a second time spot of rotating the separating follower roller 252 again, the rear end 3412 of the first film 341 is moved from the first side of the separating driving roller 251 to the second side of the separating driving roller 251. After the first predetermined time period, the separating follower roller 252 is rotated again to transport the second film 342 of the pouch 34. During the second film 342 is transported by the separating follower roller 252, the second film 342 is contacted with the separating follower roller 252, and the rear end 3422 of the second film 342 is then moved from the first side of the separating follower roller 252 to the second side of the separating follower roller 252 (Step S3).

Figure 5:
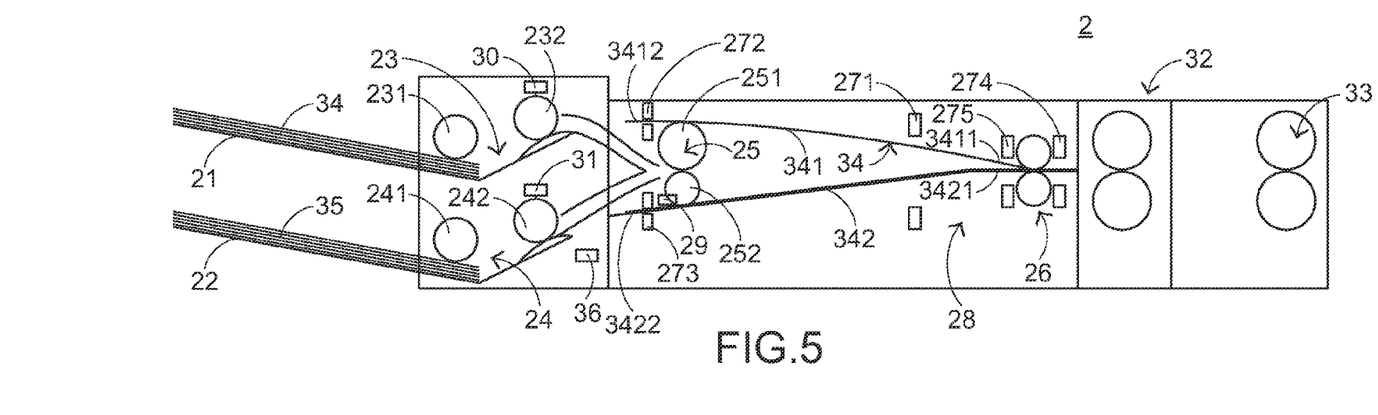
FIG. 5 is a schematic cross-sectional view illustrating the separation of the pouch by the automatic sheet laminating apparatus according to the embodiment of the present invention.
Figure 6:
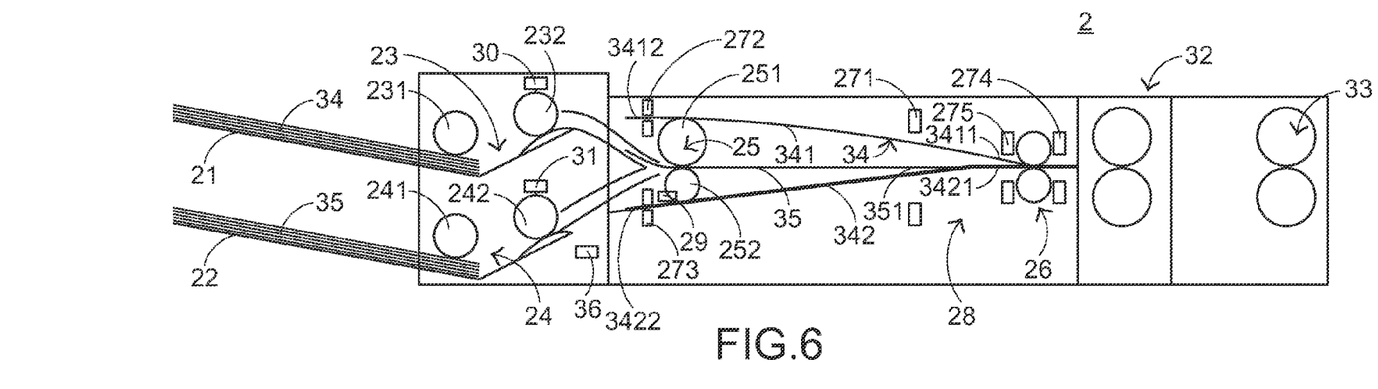
FIG. 6 is a schematic cross-sectional view illustrating the procedure of transporting the sheet article into the pouch by the automatic sheet laminating apparatus according to the embodiment of the present invention.

FIG. 5 is a schematic cross-sectional view illustrating the separation of the pouch by the automatic sheet laminating apparatus according to the embodiment of the present invention. FIG. 6 is a schematic cross-sectional view illustrating the procedure of transporting the sheet article into the pouch by the automatic sheet laminating apparatus according to the embodiment of the present invention. Please refer to FIGS. 5 and 6. During the process of transporting the pouch 34 by the separating roller assembly 25 and the front end 3411 of the first film 341 is transported through the combining roller assembly 26 and the combining-status sensor 274, the pouch 34 is detected by the combining-status sensor 274 but the sheet article 35 has not been detected by the combining-status sensor 274. As such, the combining-status sensor 274 generates a reversing signal to the control unit 36. In response to the reversing signal, the rotating direction of the combining roller assembly 26 is reversed, so that the pouch 34 is moved backwardly to the combining zone 28. During the pouch 34 is moved backwardly to the combining zone 28 and the pouch 34 is detected by the combining-status sensor 274 again, the combining-status sensor 274 issues a disabling signal to the control unit 36 after a delaying time. In response to the disabling signal, the combining roller assembly 26 stops rotation and thus the pouch 34 is clamped by the combining roller assembly 26 (Step 31). Once the combining roller assembly 26 stops rotation and the pouch 34 is clamped by the combining roller assembly 26, the front end 3411 of the first film 341 is just arranged in the rollers' centerlines of the combining roller assembly 26. At the same time, the rear end 3412 of the first film 341 is arranged at the second side of the separating driving roller 251 and detected by the first separating sensor 272; and the rear end 3422 of the second film 342 is arranged at the second side of the separating follower roller 252 and detected by the second separating sensor 273. Since the rear end 3412 of the first film 341 and the rear end 3422 of the second film 342 are respectively detected by the first separating sensor 272 and the second separating sensor 273, it is meant that the first film 341 and the second film 342 are separated from each other (see FIG. 5). Meanwhile, the second separating sensor 273 generates a sheet article feeding signal to the control unit 36. In response to the sheet article feeding signal, the second electromagnetic clutch 31 is magnetized, so that the second sheet separation roller 242 is driven to rotate. Upon rotation of the second sheet separation roller 242, the sheet article 35 placed on the second sheet input tray 22 is fed into the internal portion of the automatic sheet laminating apparatus 2. After the sheet article 35 is fed into the internal portion of the automatic sheet laminating apparatus 2, the second electromagnetic clutch 31 is no longer magnetized and thus an idle running action of the second sheet separation roller 242 is rendered. Under this circumstance, the remaindering sheet articles 35 fail to be fed into the internal portion of the automatic sheet laminating apparatus 2. Next, the sheet articles 35 is inserted into the space between the first film 341 and the second film 342 through the rear end 3412 of the first film 341 (Step S4) (See FIG. 6). During the sheet articles 35 is transported to the space between the first film 341 and the second film 342 and the sheet article 35 is detected by the spacing interval sensor 275, the spacing interval sensor 275 generates a spacing interval signal to the control unit 36. After the spacing interval signal has been received by the control unit 36 for a second predetermined time period, the separating roller assembly 25 stops rotation and thus the sheet article 35 fails to be continuously transported by the separating roller assembly 25. Meanwhile, the distance between a front end 351 of the sheet article 35 and the front end 3411 of the first film 341 is equal to a spacing interval value (Step S41). Next, the combining roller assembly 26 is rotated to transport the combination of the pouch 34 and the sheet article 35 to the laminating module 32 in order to laminate the sheet article 35 between the two films of the pouch 34 (Step S5). After the laminating procedure is completed, the laminated structure of the pouch 34 and the sheet article 35 is ejected from the automatic sheet laminating apparatus 2 by the sheet ejecting roller assembly 33.

In a case that the pouch 34 and the sheet article 35 are both detected by the combining-status sensor 274, it is meant that the pouch 34 and the sheet article 35 are being transported through the combining-status sensor 274. Until the pouch 34 and the sheet article 35 are no longer detected by the combining-status sensor 274, it is meant that the pouch 34 and the sheet article 35 have been transported through the combining-status sensor 274. Meanwhile, the combining-status sensor 274 generates a pouch feeding signal to the control unit 36. In response to the pouch feeding signal, the first electromagnetic clutch 30 is magnetized such that a next pouch 34 is transported by the first sheet pick-up roller assembly 23 into the internal portion of the automatic sheet laminating apparatus 2. The above procedures are repeatedly done, thereby laminating the next sheet article between the two films of the next pouch.

In the above embodiments, the sensors used in the automatic sheet laminating apparatus of the present invention are all optical sensors that emit light beams. When an object (e.g. the pouch 34 or the sheet article) passes through an optical sensor, the light beams emitted by the optical sensor are sheltered by the object, thereby discriminating whether the object enters the sensing range of the optical sensor. Moreover, the intensity of the light emitted by the light-emitting terminal of the spacing interval sensor 275 is stronger than other sensors, but the sensitivity of the light-receiving terminal of the spacing interval sensor 275 is lower than other sensors. In a case that the pouch 34 is transported through the spacing interval sensor 275, the light emitted by the light-emitting terminal of the spacing interval sensor 275 could penetrate through the pouch 34 and thus be received by the light-receiving terminal of the spacing interval sensor 275. Under this circumstance, the pouch 34 fails to be detected by the spacing interval sensor 275. Whereas, in a case that the sheet article 35 is transported through the spacing interval sensor 275, the light emitted by the light-emitting terminal of the spacing interval sensor 275 is sheltered by the sheet article 35. Under this circumstance, the sheet article 35 could be detected by the spacing interval sensor 275. The data associated with the predetermined time period and the delaying time could be obtained from undue experiments. By using these data to elaborately control the automatic sheet laminating method, the laminating performance is enhanced.

From the above description, the automatic sheet laminating method and the automatic sheet laminating apparatus are capable of automatically separating two films of a pouch according to the rotating status of the separating roller assembly. Since the pouch and the sheet article are combined together in an automatic manner instead of the conventional manual manner, the method and apparatus of the present invention are very labor-saving. Moreover, the using a spacing interval controller, the distance between the front end of the sheet article and the front end of the first film of the pouch could be controlled to the predetermined spacing interval value. Since the automatic sheet laminating method and the automatic sheet laminating apparatus could automatically separate the two films of the pouch and laminate the sheet article between the two films, the alignment precision of the sheet article in relation to the pouch will be increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic sheet laminating apparatus for laminating a sheet article and a pouch, said automatic sheet laminating apparatus comprising:

a first sheet input tray for placing said pouch, wherein said pouch includes a first film and a second film, and a front end of said first film is connected with a front end of said second film;

a second sheet input tray for placing said sheet article;

a plurality of transfer roller assemblies for transporting said pouch and said sheet article;

a separating roller assembly arranged at a first side of a combining zone for separating a rear end of said first film from a rear end of said second film, wherein said separating roller assembly comprises a separating driving roller and a separating follower roller, and said separating follower roller is rotated with said separating driving roller;

a braking sensor arranged in said combining zone, wherein said braking sensor generates a braking signal when said pouch is detected;

a braking element connected to said separating follower roller for controlling whether said separating follower roller stops rotation in response to said braking signal; and a control unit electrically connected to said braking sensor and said braking element for controlling said separating follower roller to stop rotation in response to said braking signal, and controlling said separating follower roller to rotate again after said braking signal has been received for a predetermined time period, wherein during said separating follower roller stops rotation, said separating driving roller is contacted with said first film such that said rear end of said first film is moved from a first side of said separating driving roller to a second side of said separating driving roller, and during said separating follower roller is rotated again, said separating follower roller is contacted with said second film such that said rear end of said second film is moved from a first side of said separating follower roller to a second side of said separating follower roller.

2. The automatic sheet laminating apparatus according to claim 1 further comprising a first separating sensor, which is arranged at said second side of said separating driving roller and electrically connected to said control unit for detecting whether said rear end of the first film is transported to said second side of said separating driving roller.

3. The automatic sheet laminating apparatus according to claim 2 further comprising a second separating sensor, which is arranged at said second side of said separating follower roller and electrically connected to the control unit for detecting whether said rear end of said second film is transported to said second side of said separating follower roller, wherein when said rear end of said first film is detected by said first separating sensor and said rear end of said second film is detected by said second separating sensor, said second separating sensor generates a sheet article feeding signal to said control unit, and said sheet article is transported in response to said sheet article feeding signal.

4. The automatic sheet laminating apparatus according to claim 3 wherein said transfer roller assemblies comprise:
- a first sheet pick-up roller assembly disposed over said first sheet input tray for feeding said pouch into an internal portion of said automatic sheet laminating apparatus;
- a second sheet pick-up roller assembly disposed over said second sheet input tray for feeding said sheet article into said internal portion of said automatic sheet laminating apparatus; and
- a sheet ejecting roller assembly arranged at a second side of said combining zone for ejecting a laminated structure of said pouch and said sheet article from said automatic sheet laminating apparatus.

5. The automatic sheet laminating apparatus according to claim 4 wherein said first sheet pick-up roller assembly comprises a first sheet pick-up roller and a first sheet separation roller, and said second sheet pick-up roller assembly comprises a second sheet pick-up roller and a second sheet separation roller.

6. The automatic sheet laminating apparatus according to claim 5 further comprising:
- a first electromagnetic clutch electrically connected to said first sheet separation roller and said control unit to allow for an idle running action of said first sheet separation roller, so that said pouch in contact with said first sheet pick-up roller fails to be fed into said internal portion of said automatic sheet laminating apparatus; and
- a second electromagnetic clutch electrically connected to said second sheet separation roller and said control unit to allow for an idle running action of said second sheet separation roller, so that said pouch in contact with said second sheet pick-up roller fails to be fed into said internal portion of said automatic sheet laminating apparatus, wherein when said sheet article feeding signal is received by said control unit, said second electromagnetic clutch is controlled to be magnetized, so that said second sheet separation roller is driven to rotate to transport said sheet article.

7. The automatic sheet laminating apparatus according to claim 1 further comprising a combining-status sensor, which is arranged at a second side of said combining zone and electrically connected to the control unit, wherein said combining-status sensor generates a reversing signal to said control unit when said pouch is detected by said combining-status sensor but said sheet article has not been detected by said combining-status sensor.

8. The automatic sheet laminating apparatus according to claim 7 further comprising a combining roller assembly, which is arranged between said combining zone and said combining-status sensor and electrically connected to said control unit for transporting said pouch and said sheet article, wherein a rotating direction of said combining roller assembly is reversed in response to said reversing signal, so that said pouch is moved backwardly to said combining zone.

9. The automatic sheet laminating apparatus according to claim 8 wherein when said pouch is moved backwardly to said combining zone and said pouch is detected by said combining-status sensor again, said combining-status sensor issues a disabling signal to said control unit after a delaying time, and said combining roller assembly stops rotation and clamps said pouch in response to said disabling signal.

10. The automatic sheet laminating apparatus according to claim 8 further comprising a spacing interval sensor, which is arranged between said combining zone and said combining roller assembly and electrically connected to said control unit, wherein when said sheet article is detected by said spacing interval sensor, said spacing interval sensor generates a spacing interval signal to said control unit, wherein after said spacing interval signal has been received by said control unit for a second predetermined time period, said separating roller assembly is disabled, so that said sheet article is no longer transported by said separating roller assembly and a distance between a front end of said sheet article and said front end of said first film is equal to a spacing interval value.

11. The automatic sheet laminating apparatus according to claim 7 wherein when said pouch and said sheet article are being transported through said combining-status sensor, said pouch and said sheet article are both detected by said combining-status sensor, and until said pouch and said sheet article are no longer detected by said combining-status sensor, said combining-status sensor generates a pouch feeding signal to said control unit, wherein a next pouch is transported into an internal portion of the automatic sheet laminating apparatus in response to said pouch feeding signal.

12. The automatic sheet laminating apparatus according to claim 1 further comprising a laminating module, which is arranged at a second side of said combining zone for laminating said sheet article between said first film and said second film of said pouch.

13. The automatic sheet laminating apparatus according to claim 1 wherein said braking element is an electromagnet.

14. The automatic sheet laminating apparatus according to claim 1 wherein said control unit is a microprocessor.

* * * * *